United States Patent
Itaya et al.

[15] 3,671,548
[45] June 20, 1972

[54] 5-PROPARGYLTHENYL CYCLOPROPANECARBOXYLATES

[72] Inventors: Nobushige Itaya, Minuo; Toshio Mizutani, Hirakata; Shigeyoshi Kitamura; Yositosi Okuno, both of Toyonaka; Keimei Fujimoto, Kobe, all of Japan

[73] Assignee: Sumitomo Chemical Company, Ltd., Higashi-ku, Osaka, Japan

[22] Filed: March 26, 1970

[21] Appl. No.: 23,018

[30] Foreign Application Priority Data

April 4, 1969 Japan..................................44/26433
April 11, 1969 Japan..................................44/28586

[52] U.S. Cl. ..........260/332.2 R, 260/332.2 A, 260/332.3 R, 260/332.5, 424/275
[51] Int. Cl. .....................................................C07d 63/12
[58] Field of Search ..................260/332.2 R, 332.2 A, 468 P

[56] References Cited

UNITED STATES PATENTS 3,515,730   6/1970   Matsui et al. .........................260/332.2
3,519,649   7/1970   Ueda et al............................260/332.2
3,285,950   11/1966  Weber...................................260/468

*Primary Examiner*—Henry R. Jiles
*Assistant Examiner*—Cecilia M. Shurko
*Attorney*—Stevens, Davis, Miller & Mosher

[57] ABSTRACT

A thiophene derivative having the formula,

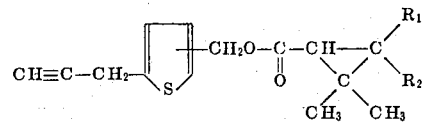

wherein $R_1$ is hydrogen or methyl, and $R_2$ is methyl, 2-methyl-1-propenyl or 2-methoxycarbonyl-1-propenyl when $R_1$ is hydrogen, and $R_2$ is methyl when $R_1$ is methyl, which may be used as insecticides with high insecticidal activities.

7 Claims, No Drawings

5-PROPARGYLTHENYL CYCLOPROPANECARBOXYLATES

The present invention relates to novel thiophene derivatives, more particularly to novel 5-propargylthenyl cyclopropanecarboxylate having high insecticidal activities, and a process for the production thereof.

The present invention also relates to a composition containing said thiophene derivatives.

The present invention further relates to novel 5-propargylthenyl derivatives which may be used as starting materials for the production of said thiophene derivatives and a process for the production thereof.

Among the insecticides used at present time, nothing can compare with pyrethrum extracts including pyrethrin or synthetic allethrin which is a homologue thereof, in the fact that it can be used without anxiety due to its harmlessness to mammals and cattles in spite of its immediate effect. However, the pyrethrum extract and homologue thereof are relatively expensive, and are rather limited in the use despite of their excellent usefulness.

After studying to obtain new effective esters, the inventors have found a new type ester which is remarkably excellent in insecticidal activity as compared with the above pyrethrin and its homologue and is prepared at low costs. Thus, the present invention is achieved.

According to the present invention, novel thiophene derivatives are provided, said derivative having the formula,

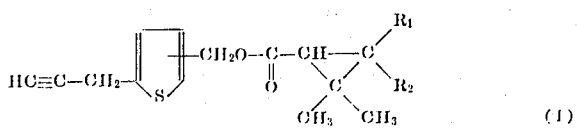

wherein $R_1$ is hydrogen atom or methyl group, and $R_2$ is methyl group, 2-methyl-1-propenyl group or 2-methoxycarbonyl-1-propenyl group when $R_1$ is hydrogen atom, and $R_2$ is methyl group when $R_1$ is methyl group.

It will be appreciated that the novel derivative of formula (I) includes naturally optically active isomers which occur due to the asymmetric carbon atom possibly present in the carboxylic acid moiety such as d-trans-chrysanthemum-monocarboxylic residue.

Among the derivatives represented by the formula (I), the especially useful ones that are not limitative in the present invention, are enumerated as follows:

| Compound number | Structure |
|---|---|
| 1 | 5-propargyl-2-thenyl chrysanthemate, $n_D^{25}$ 1.5292 |
| 2 | 5-propargyl-3-thenyl chrysanthemate, $n_D^{25}$ 1.5264 |
| 3 | 5'-propargyl-2'-thenyl 2,2,3,3-tetramethylcyclopropane carboxylate $n_D^{25}$ 1.5249 |
| 4 | 5'-propargyl-3'-thenyl 2,2,3,3-tetramethylcyclopropane carboxylate, $n_D^{25}$ 1.5220 |
| 5 | 5'-propargyl-2'-thenyl-2,2,3-trimethylcyclopropane carboxylate, $n_D^{25}$ 1.5256 |
| 6 | 5-propargyl-2-thenyl pyrethrate, $n_D^{25}$ 1.5411 |

The thiophene derivative of formula (I) has an excellent activity for killing insects such as houseflies, mosquitoes, cockroaches and the like, and can be used as insecticidal compositions not only in a wide scope of the prevention of epidemics but also controlling insects injurious to stored cereals, agriculture, especially crops before harvest, household horticulture, greenhouse cultivation and food-packaging, without anxiety due to its low toxicity.

The thiophene derivative of formula (I) is prepared for the first time by the present inventors, and may be obtained easily and in good yield, for example, by the method comprising reacting a thenyl derivative represented by the formula,

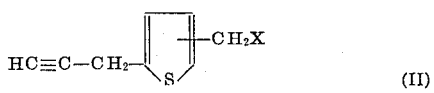
(II)

wherein X is hydroxyl group or a halogen atom, with a cyclopropanecarboxylic acid of the formula,

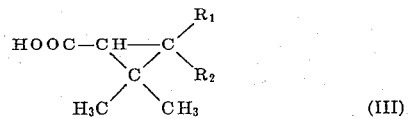
(III)

wherein $R_1$ and $R_2$ are same as defined above, or its reactive derivatives, in the presence of suitable reaction-auxiliary agent, if necessary.

The thenyl derivative of formula (II) used in the method of the present invention is selected in such a relation of the other reactant, cyclopropane carboxylicacid and its reactive derivatives of formula (III) as to enable it to be subjected to esterification. The reactive derivatives of the carboxylic acid of formula (III) means corresponding acid halide, acid anhydride, lower alkyl ester or salt. The following disclosure will explain more particularly the method of the preparation of the cyclopropanecarboxylic acid ester of formula (I) according to the present invention.

The first embodiment of the method is to obtain the objective ester by reacting as the thenyl derivative an alcohol of the formula

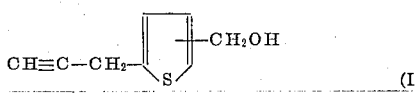
(IV)

with the cyclopropanecarboxylic acid of formula (III), acid halide, or acid anhydride thereof. When the acid itself is used, the reaction is completed under the condition of dehydration. Thus, the reaction may be carried out in an inert solvent such as benzene, petroleum ether, containing a dehydrating agent such as dicyclohexylcarbodiimide with or without heating.

When the acid halide is used, the reaction is effected well at the room temperature in the presence of an organic tertiary amine such as pyridine, triethylamine and the like as a dehydrogen halide agent. The acid halide used may be any ones, but acid chloride is usually used. In the reaction, the use of solvents is preferable to allow the reaction to proceed smoothly, and an inert solvent such as benzene, toluene and petroleum benzine is preferably used.

When the acid anhydride is used as the reactant, the reaction can proceed without any reaction-auxiliary agent well at the room temperature to form the objective ester of formula (I). The warming of the reaction system and the use of solvents are favorable for allowing reaction to proceed smoothly, but they are not always indispensable.

The second embodiment of the process according to the present invention is to prepare the objective ester of formula (I) from thenyl halides of the formula

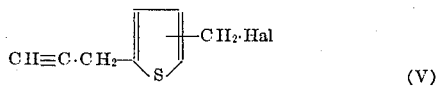
(V)

wherein Hal is a halogen atom. The another reactant is the salts of the carboxylic acid of formula (III) with alkali metals or tertiary amines, which salts may be formed in the reaction by adding the corresponding bases forming such salts to the reaction mixture. The reaction is preferably carried out in the presence of an inert solvent such as benzene, acetone and the like at a temperature of the boiling point or the lower of the solvents for allowing the reaction to proceed. Among the halogen atoms represented by Hal in formula (V), chlorine or bromine atom is, in general, common, but other halogen atoms may be selected optionally.

The third embodiment of the method according to the present invention is to obtain the objective ester of formula (I) from thenyl-tosylates of the formula,

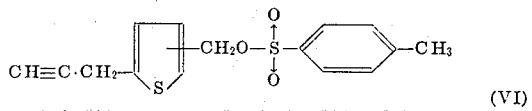
(VI)

In this case, the another reactant is those same as used in the second embodiment, and the reaction condition is also same as that used therein.

The cyclopropanecarboxylic acid of formula (III) used as the reactant according to the present invention can be prepared by already known process, and, if necessary, may be converted to each of the reactive derivative according to well known method.

It will be appreciated that the cyclopropane-carboxylic acid of formula (III) and its derivatives may include optically active isomers such as d-transchrysanthemic acid and reactive derivatives thereof.

The thenyl derivative of formula (II) is a novel compound, therefore the present invention is also relates to the thenyl derivative of formula (II) and to a process for the production thereof.

The thenyl alcohols of the formula (II) are obtained through the following synthesis course:

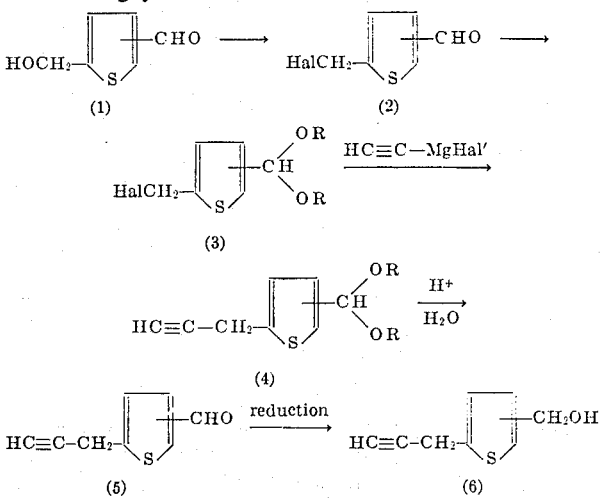

wherein Hal and Hal' are halogen atoms, and R is a lower alkyl group or the two Rs may be bonded together to form a lower alkylene group.

The aldehyde alcohol of the formula (1), for example, 5-hydroxymethyl-2-thenaldehyde which is the starting material employed in the above-mentioned process may be obtained, according to the reaction equation set forth below, as disclosed by Ya. L. Gol'dfarb et al. in C.A. 60 9227.

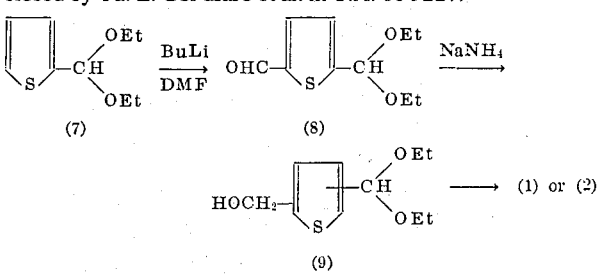

Ya. L. Gol'dfarb et al. showed in C.A. 61 629 that the 5-halomethyl thenaldehyde of the formula (2) was synthesized by reacting 2-thenaldehyde with dichlorodimethyl ether in the presence of an aluminum chloride catalyst. This substance, however, is contained in the reaction product in an amount of only 33 percent and has not been isolated. All the compounds after formula (3), i.e. the 5-halomethyl thenaldehyde acetals (3), the 5-propargyl thenaldehyde acetals (4), the 5-propargyl thenaldehydes (5), the 5-propargyl thenyl alcohols (6), and the 5-propargyl thenyl halide, are novel compounds unknown from the literature.

The reactions of the above-mentioned equation are explained in succession below.

The halomethyl thenaldehyde of the formula (2) is obtained by halogenating the 5-hydroxymethyl thenaldehyde (1) with a common halogenating agent such as, for example, thionyl chloride, phosphorus oxychloride, phosphorus trichloride, phosphorus tribromide, hydrogen chloride or hydrogen bromide. When the 5-hydroxymethyl thenaldehyde acetal of the formula (9) is used as the starting material, it is hydrolyzed to obtain the aldehyde (1), which can then be halogenated with concentrated hydrohalic acid, without being isolated but in the form of an aqueous solution.

The 5-halomethylacetal of the formula (3) may be easily obtained by reacting the 5-halomethylthenaldehyde of the formula (2) with an alcohol and an excess amount of a lower alkyl orthoformate in the presence or absence of an acid catalyst, preferably at below room temperature.

The 5-propargylthenaldehyde acetal of the formula (4) may be obtained in such a favorable yield as in the case of the furan derivative, which is reported by Ferdinand Bohlmann et al. in Chem. Ber. 98 2602 (1965) by reacting the 5-halomethylthenaldehyde acetal of the formula (3) with a Grignard reagent having the formula, CH C·MgHal' wherein Hal' is a halogen, which is prepared according to, for example, the E.R.H. Jones et al.'s method disclosed in J.C.S. 1956, 4765, in the presence of a slight amount of a catalyst such as cuprous chloride and the like.

When this acetal (4) is treated according to an ordinary aldehyde regeneration reaction, i.e. in an aqueous dilute mineral acid solution, or so, the aldehyde of the formula (5) can be obtained quantitatively at room temperature. The thus obtained aldehyde (5) is subjected to reduction reaction to obtain the objective thenyl alcohol of the formula (6). As reducing agents, there are frequently used boron hydride compounds such as sodium borohydride, lithium borohydride, potassium borohydride and diborane. As solvents, there may be used water and such polar organic solvents as lower alcohol, dioxane and tetrahydrofuran, either singly or in admixture. The reaction temperature is adequately such a low temperature as below room temperature. The adoption of such a high temperature as above 100° C. is not desirable because there is brought about the reduction of triple bond to double bond. Further, the addition of alkali should strictly be avoided because even such weak alkali as sodium carbonate causes the isomerization of triple bond to allene.

The thenyl alcohol may be easily converted to the halide thereof by the halogenation reaction.

In the preparation of insecticidal compositions, the new esters of formula (I) may be formulated into any desired forms of oil sprays, emulsifiable concentrates, dusts, wettable powders, aerosols, mosquito coils, fumigants, granules, baits and luring dust or solid preparation, according to known method in the art, using auxiliary agents and/or carriers for common insectial compositions.

The insecticidal compositions thus formed may be increased in its activity when used in admixture with a synergist for pyrethroid such as 3,4,-methylenedioxy-6-propylbenzylbutyldiethylene glycol ether (hereinafter referred to as "-piperonylbutoxide"), 1,2-methylenedioxy-4-[2-(octylsulfinyl)-propyl]-benzene (hereinafter referred to as "sulfoxide"), 4-(3,4-methylenedioxyphenyl)-5-methyl-1,3-dioxane (referred to as "sufroxane"), N-(2-ethylhexyl)-bicyclo[2,21]hepta-5-ene-2,3-dicarboximide (hereinafter referred to as "MGK-264," registered trade name for said imide produced by McRolin Gormley King Co.), N-(4-pentynyl)-phthalimide or n-propyl-0-propargylphenyl phosphonate (hereinafter referred to as "NIA-16388"). When the present compounds are formulated into mosquito coils, the activity can be increased by incorporation of a known additive therefor, such as terephthalic or isophthalic acid and butylhydroxytoluene (referred to as "BHT"). In addition, the present compounds may be formulated into multi-purpose compositions by incorporating other active ingredients such as pyrethroids, for example, pyrethrum extracts, allethrin, 3,4,5,6,-tetrahydrophthalimidomethyl chrysanthemate (hereinafter referred to as phthalthrin), 5-benzyl-3-furylmethyl chrysanthemate (referred to as chrysron, which is a trademark of Sumitomo Chemical Co., Ltd.); organic chloride insecticides, for example, dichlorodiphenyl-trichloromethane (referred to as "DDT"), benzene hexachloride (referred to as "BHC") and methoxychlor; organophosphorus insecticides, for example, 0,0-dimethyl-0-(3-methyl-4-nitrophenyl) phosphorothioate (hereinafter referred to as "fenitrothion"), 0,0-dimethyl-0-(2,2-dichlorovinyl) phosphate (referred to as "DDVP"); carbamate type insecticides, for example, 1-napthyl-N-methylcarbamate and 3,4-xylyl-N-methylcarbamate; or other insecticides, fungicides, acaricides, herbicides, fertilizers or other agricultural chemicals.

The present invention will be more particularly illustrated by the following Examples which should not restrict the invention defined in the attached claims.

Examples 1 to 6

Production of the thiophene derivatives

The thiophene derivatives of the present invention shown in Table 1 were produced by standard processes each represented by A, B, C and D as follows:

Process A: The reaction of the thenyl alcohol of the formula (6) and the carboxylic acid halide.

A solution of 0.05 mole of alcohol in 3 times the volume of said alcohol of dry benzene is charged with 0.07 mole of pyridine. To this solution is added a solution of 0.053 mole of the carboxylic acid chloride in 3 times the volume of said chloride of dry benzene, whereby an exothermic reaction takes place. After allowing to stand overnight in a tightly closed vessel, the mixed solution is charged with a small amount of water to dissolve a precipitate of pyridine hydrochloride, and the aqueous layer is separated. The organic layer is washed successively with a 5 percent aqueous hydrochloric acid solution and a saturated aqueous sodium chloride solution, and is dried over anhydrous sodium sulfate. Thereafter, the benzene is removed by distillation, and the residue is distilled under reduced pressure to obtain a desired product in the form of plae yellow oil.

B. Process according to reaction of the thenyl halides with the carboxylic acids:

A mixture comprising 0.05 mole of the halide and 0.06 mole of the carboxylic acid is dissolved in 3 times the volume of said mixture of acetone, and the solution is maintained at 15°– 20° C. Into this solution is gradually dropped a solution of 0.08 mole of triethylamine in 3 times the volume of said triethylamine of acetone. After completion of the dropping, the mixed solution is refluxed for 2 hours to terminate the reaction. After cooling the reaction liquid, a deposited triethylamine hydrochloride is separated by filtration, and the acetone is removed by distillation from the filtrate. The residue is dissolved in 3 times the volume of said residue of toluene, and the solution is subjected to the same after-treatment as in the standard operational process A to obtain a desired product.

C. Process according to reaction of the thenyl alcohols with the carboxylic acid anhydrides:

To a solution of 0.05 mole of alcohol in 3 times the volume of said alcohol of toluene is added 0.05 mole of the carboxylic acid anhydride (synthesized from the carboxylic acid and anhydrous acetic acid). The mixture is reacted at 100° C. for 3 hours and is then cooled. Subsequently, the reaction liquid is freed by distillation from the solvent and is then subjected to reduced pressure distillation to recover the carboxylic acid distilled as an initial distillate and, thereafter, a desired product is recovered.

D. Process according to dehydration reaction of the thenyl alcohols with the carboxylic acids:

A mixture comprising 0.05 mole of alcohol and 0.05 mole of the carboxylic acid is dissolved in 3 times the volume of said mixture of benzene. To this solution is added 0.08 mole of dicyclohexyl carbodiimide, and the resulting mixture is allowed to stand overnight in a tightly closed vessel. On the next day, the mixture is refluxed for 2 hours to terminate the reaction, and is then subjected to the same after-treatment as in the standard operational process A to obtain a desired product.

Reactions were effected according to the above-mentioned standard operational processes to obtain the results set forth in the following table:

charged into an aerosol container. After attaching a valve portion to the container, 85 parts of a propellant (liquefied petroleum gas) was filled under pressure through said valve portion into the container to obtain an aerosol.

Example 14

A solution comprising 0.2 part of the present compound (6), 1 part of pyrethrum extract (containing 20 percent pyrethrin), 0.5 part of Sumithion, 6.5 parts of xylene and 6.8 parts of deodorized kerosene was treated in the same manner as in Example 13 to obtain an aerosol.

| Example number | Thiophene derivative | Acid or its derivative | Reaction process | Thenyl cyclopropanecarboxylate obtained | | | | | | | |
|---|---|---|---|---|---|---|---|---|---|---|---|
| | | | | Name of compound | Yield (percent) | Refractive index ($n_D^{25}$) | Elemental analysis (percent) | | | | |
| | | | | | | | Calculated | | | Found | |
| | | | | | | | C | H | S | C | H | S |
| 1 | 5-propargyl-2-thenyl alcohol. | (±)-cis, trans-chrysanthemic acid chloride. | A | 5-propargly-2-thenylchrysanthemate. | 91 | 1.5292 | 71.5 | 7.3 | 10.6 | 71.5 | 7.3 | 10.6 |
| | | | | | | | (for $C_{18}H_{22}O_2S$) | | | | | |
| 2 | 5-propargyl-3-thenyl alcohol. | do | C | 5-propargyl-3-thenylchrysanthemate. | 88 | 1.5264 | 71.5 | 7.3 | 10.6 | 71.3 | 7.4 | 10.4 |
| | | | | | | | (for $C_{18}H_{22}O_2S$) | | | | | |
| 3 | 5-propargyl-2-thenyl chloride. | 2,2,3,3-tetramethylcyclopropanecarboxylic acid. | B | 5'-propargyl-2'thenyl 2,2,3,3-tetramethylcyclopropanecarboxylate. | 86 | 1.5249 | 69.5 | 7.3 | 11.6 | 69.5 | 7.5 | 11.5 |
| | | | | | | | (for $C_{16}H_{20}O_2S$) | | | | | |
| 4 | 5-propargyl-3-thenyl alcohol. | 2,2,3,3-tetramethylcyclopropane carboxylic acid. | A | 5'-propargyl-3'thenyl 2,2,3,3-tetramethylcyclopropanecarboxylate. | 90 | 1.5220 | 69.5 | 7.3 | 11.6 | 69.4 | 7.6 | 11.2 |
| | | | | | | | (for $C_{16}H_{20}O_2S$) | | | | | |
| 5 | 5-propargyl-2-thenyl alcohol. | 2,2,3-trimethylcyclopropanecarboxylic acid. | D | 5'propargyl-2'thenyl 2,2,3-trimethylcyclopropanecarboxylate. | 85 | 1.5256 | 68.7 | 6.9 | 12.2 | 68.6 | 7.2 | 12.0 |
| | | | | | | | (for $C_{15}H_{18}O_2S$) | | | | | |
| 6 | do | (±)-trans, trans-pyrethric acid chloride. | A | 5-propargyl-2-thenyl pyrethrate. | 88 | 1.5411 | 65.9 | 6.4 | 9.3 | 65.9 | 6.6 | 9.2 |
| | | | | | | | (for $C_{19}H_{22}O_4S$) | | | | | |

Examples 7 – 19 and Test Examples 1 – 8

The thiophone derivatives used are represented by the numbers of the components exemplified previously, and parts are by weight.

Example 7

0.05 part of each of the present compounds (1) and (2) was dissolved in deodorized kerosene to make the total amount 100 parts, whereby 0.05 percent oil solutions of the individual compounds were obtained.

Example 8

0.1 part of each of the present compounds (2), (3), (4) and (5) was dissolved in deodorized kerosene to make the total amount 100 parts, whereby 0.1 percent oil solutions of the individual compounds were obtained.

Example 9

A mixture comprising 0.05 part of each of the present compounds (1), (2), (4) and (5) and 0.02 part of NIA-16388 was dissolved in deodorized kerosene to make the total amount 100 parts, whereby oil solutions of the individual compounds were obtained.

Example 10

A mixture comprising 0.05 part of the present compound (3) and 0.05 part of Chryson was dissolved in deodorized kerosene to make the total amount 100 parts, whereby an oil solution was obtained.

Example 11

20 parts of each of the present compounds (1), (2), (3) and (6), 10 parts of Sorpol SM–200 (registered trade name for an emulsifier produced by Toho Chemical Co.) and 70 parts of xylene were thoroughly stirred, mixed and dissolved together to obtain an emulsifiable concentrate containing 20 percent of each of the above-mentioned present compounds.

Example 12

A solution of 0.06 g. of each of the present compounds (1) and (3) and a d-trans isomer of the present compound (1) in 20 ml. of methanol was homogeneously stirred and mixed with 99.4 g. of a mosquito coil carrier (a 3 : 5 : 1 mixture of Tabu powder, pyrethrum marc and wood powder). After removing the methanol by vaporization, the mixture was thoroughly kneaded with 150 ml. of water and was then shaped and dried to obtain 0.6 percent mosquito coils of the individual compounds.

Example 13

A solution comprising 0.2 part of the present compound (1), 0.2 part of Phthalthrin, 2 parts of piperonyl butoxide, 6 parts of xylene and 6.6 parts of deodorized kerosene was Example 15

A mixture comprising 0.25 part of the present compound (3), 0.25 part of Chrysron, 13.5 parts of deodorized kerosene and 1 part of Atmos 300 (registered trade name for an emulsifier produced by Atlas Chemical Industries, Inc.) was emulsified with addition of 50 parts of pure water, and was then filled into an aerosol container together with 35 parts of a 3 : 1 mixture of deodorized butane and deodorized propane, whereby a water-based aerosol was obtained.

Example 16

A solution of 0.2 g. of the present compound (3) and 0.1 g. of allethrin in a suitable amount of chloroform was uniformly adsorbed onto the surface of asbestos of 2.5 cm. × 1.5 cm. in area and 0.3 mm. in thickness. Onto this surface was applied asbestos identical in size therewith to obtain a fibrous insecticidal fumigant composition to be used on a heating plate.

The asbestos may be replaced by other fibrous carrier having the same effect, such as a pulp sheet or the like.

Example 17

A solution of 1 part of each of the present compounds (1) and (6) in 20 parts of acetone was mixed with 99 parts of 300 mesh diatomaceous earth, and the mixture was thoroughly stirred in a mortar. Thereafter, the acetone was removed by vaporization to obtain dusts of the individual compounds.

Example 18

A mixture comprising 5 parts of the present compound (1), 5 parts of Toyolignin (registered trade name for a product of Toyo Spinning Co.) and 90 parts of GSM clay (registered trade name for a clay produced by Zieklite Mining Co.) was thoroughly stirred in a mortar. Subsequently, the mixture was thoroughly kneaded with 10 percent based on the amount of said mixture of water, was granulated by means of a granulator and was then dried in air to obtain a granule.

Example 19

A mixture comprising 25 parts of the present compound (1), 5 parts of Sorpol SM–200 and 70 parts of 300 mesh talc was thoroughly stirred in a mortar to obtain a wettable powder.

Insecticidal effects of the present compositions obtained in the above manner are shown below with reference to test examples.

Test Example 1

5 ml. of each of the oil solutions obtained in Examples 7, 8, 9 and 10 was sprayed, using the Campbel's turn table apparatus [Soap and Sanitary Chemicals, Vol. 14, No. 6, 119

(1938)] 20 seconds had elapsed from the spraying, the shutter was opened and housefly adults (about 100 flies per group) were exposed to the settling mist for 10 minutes and were then transferred to an observation cage. In the cage, the flies were fed and were allowed to stand 1 day at room temperature. Thereafter, the number of killed flies were counted to calculate the mortality thereof.

The results were as shown in Table 1.

more than 90 percent of the mosquitoes could be knocked down within 20 minutes.

Test Example 5

Insecticidal effects of the aerosols obtained in Examples 13, 14 and 15 were tested according to the aerosol test method using Peet Grady's chamber [the method disclosed in Soap and Chemical Specialities, Blue Book (1965)] to obtain the results as set forth in Table 3.

TABLE 3

| Composition | Sprayed amount (g./1,000 ft.³) | Knock-down ratio (percent) | | | Mortality (percent) |
|---|---|---|---|---|---|
| | | 5 min. | 10 min. | 15 min. | |
| Aerosol of Example 18 | 3.1 | 24 | 68 | 93 | 87 |
| Aerosol of Example 19 | 3.0 | 29 | 75 | 96 | 94 |
| Water-based aerosol of Example 20 | 2.8 | 20 | 78 | 98 | 95 |

TABLE 1

| Composition | Mortality (percent) |
|---|---|
| Oil solution of Example 7 containing 0.05% of the compound (1) | 90 |
| Oil solution of Example 7 containing 0.05% of the compound (6) | 84 |
| Oil solution of Example 8 containing 0.1% of the compound (2) | 85 |
| Oil solution of Example 8 containing 0.1% of the compound (3) | 82 |
| Oil solution of Example 8 containing 0.1% of the compound (4) | 90 |
| Oil solution of Example 8 containing 0.1% of the compound (5) | 80 |
| Oil solution of Example 9 containing 0.05% of the compound (1) and 0.2% of NIA-16388 | 100 |
| Oil solution of Example 9 containing 0.05% of the compound (2) and 0.2% of NIA-16388 | 90 |
| Oil solution of Example 9 containing 0.05% of the compound (4) and 0.2% of NIA-16388 | 98 |
| Oil solution of Example 9 containing 0.05% of the compound (5) and 0.2% of NIA-16388 | 89 |
| Oil solution of Example 10 containing 0.05% of the compound (3) and 0.05% of the Chrysron | 95 |
| Oil solution containing 0.1% of allethrin | 52 |

Test Example 2

Each of the emulsifiable concentrates obtained in Example 11 was diluted with water to a concentration of 0.05 p.p.m., and the resulting emulsion was charged into a styrene case of 23 cm. × 30 cm. with a depth of 6 cm. Into the case, about 50 full-grown larvae of northern house mosquitoes were liberated. On the next day, the alive and dead larvae were observed to obtain the results set forth in Table 2.

TABLE 2

| Composition | Mortality (percent) |
|---|---|
| 0.05 p.p.m. solution of the emulsifiable concentrate of the compound (1) | 100 |
| 0.05 p.p.m. solution of the emulsifiable concentrate of the compound (2) | 95 |
| 0.05 p.p.m. solution of the emulsifiable concentrate of the compound (3) | 88 |
| 0.05 p.p.m. solution of the emulsifiable concentrate of the compound (6) | 82 |
| 0.05 p.p.m. solution of an emulsifiable concentrate of pyrethrin | 75 |

Test Example 3

About 50 adults of northern house mosquitoes were liberated in a (70 cm)³ glass chamber. 1 g. of each mosquito coils obtained in Example 12 was ignited on both ends and placed at the center of the bottom of the chamber. Thereafter, the number of knocked-down insects was counted with lapse of time, with the result that every mosquito coil could knock down more than 80 percent of the mosquitoes within 20 minutes.

Test Example 4

About 50 adults of northern house mosquitoes were liberated in a (70 cm)³ glass chamber. The fumigant composition obtained in Example 16 was placed on an electric heating plate in the chamber and was heated and fumigated, whereby Test Example 6

A glass Petri dish of 14 cm. in inner diameter and 7 cm. in height was coated on the inner wall with butter, leaving at the lower part an uncoated area of about 1 cm. in width. Onto the bottom of the dish, each of the dusts obtained in Example 17 was uniformly dusted in a proportion of 2 g/m². Subsequently, 10 German cockroach adults were liberated in the dish and were contacted with the dust, whereby more than 90 percent of the cockroaches were knocked-down after 1 day and more than 90 percent thereof could be killed after 3 days.

Test Example 7

In a 1/50,000 Wagner pot were grown rice plants which had elapsed 45 days after sowing. Onto the rice plants was sprayed in a proportion of 10 ml/pot an aqueous 500 time-diluted solution of the wettable powder obtained in Example 19. Subsequently, the pot was covered with a wire net, and about 50 adults of green rice leafhoppers were liberated therein, whereby more than 90 percent of the insects could be killed after 1 day.

Test Example 8

10 liters of water was poured into a 14 liter-polyethylene bucket. Into the water was charged 1 g. of the granule obtained in Example 18. After 1 day, about 100 full-grown larvae of northern house mosquitoes were liberated in the water and the alive and dead thereof were observed with the result that more than 90 percent of the larvae could be killed within 24 hours.

What is claimed is:

1. A thiophene derivative represented by the formula,

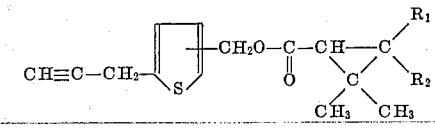

wherein $R_1$ is hydrogen atom or methyl group, and $R_2$ is methyl group, 2-methyl-1-propenyl group or 2-methoxy-carbonyl-1-propenyl group when $R_1$ is hydrogen atom, and $R_2$ is methyl group when $R_1$ is methyl group.

2. 5-Propargyl-2-thenyl chrysanthemate.
3. 5-Propargyl-3-thenyl chrysanthemate.
4. 5'-propargyl-2'-thenyl 2,2,3,3,-tetramethylcyclopropanecarboxylate.
5. 5'-propargyl-3'-thenyl 2,2,3,3-tetramethylcyclopropanecarboxylate.
6. 5-Propargyl-2-thenyl 2,2,3-trimethylcyclopropanecarboxylate.
7. 5-Propargyl-2-thenyl pyrethrate.

* * * * *